(12) United States Patent
Wang et al.

(10) Patent No.: US 9,231,936 B1
(45) Date of Patent: Jan. 5, 2016

(54) CONTROL AREA NETWORK AUTHENTICATION

(71) Applicant: Symantec Corporation, Mountain View, CA (US)

(72) Inventors: Qiyan Wang, Santa Clara, CA (US); Shankar Somasundaram, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/179,058

(22) Filed: Feb. 12, 2014

(51) Int. Cl.
*H04L 29/06* (2006.01)

(52) U.S. Cl.
CPC .................................... *H04L 63/08* (2013.01)

(58) Field of Classification Search
CPC ........................................................ H04L 63/08
See application file for complete search history.

(56) References Cited

U.S. PATENT DOCUMENTS

| | | | | |
|---|---|---|---|---|
| 5,799,084 | A * | 8/1998 | Gallagher et al. | 380/248 |
| 6,348,875 | B1 * | 2/2002 | Odinak et al. | 340/9.11 |
| 2003/0235309 | A1 * | 12/2003 | Struik et al. | 380/278 |
| 2010/0185850 | A1 * | 7/2010 | Liu | 713/156 |
| 2011/0201365 | A1 * | 8/2011 | Segura | 455/466 |
| 2013/0222109 | A1 * | 8/2013 | Lim | 340/5.8 |

FOREIGN PATENT DOCUMENTS

WO WO 2007093946 A1 * 8/2007 ............. G11B 20/00

OTHER PUBLICATIONS

Dvinsky, Alex, and Roy Friedman. "Chameleon—a group communication framework for smartphones." Software: Practice and Experience (2014).*
Groza et al., Higher layer authentication for broadcast in controller area network, 6th International Conference on Security and Cryptography, SECRYPT, Jul. 2011.
Szilagy et al., Low Cost Multicast Authentication via Validity Voting in Time-Triggered Embedded Control Networks, Institute for Software Research, Carnegie Mellon University, 2010.
Lin et al., Cyber-Security for the Controller Area Network (CAN) Communication Protocol, International Conference on Cyber Security, Dec. 2012. (Abstract Only).
Schweppe et al., Car2X Communication: Securing the Last Meter, Vehicular Technology Conference (VTC Fall), IEEE, Sep. 2011.
Szilagy et al., Flexible Multicast Authentication for Time-Triggered Embedded Control Network Applications, Institute for Software Research, Carnegie Mellon University, 2009.
Groza et al., LiBrA-CAN: a Lightweight Broadcast Authentication protocol for Controller Area Networks, 11th International Conference, Proceedings, CANS 2012, Darmstadt, Germany, Dec. 12-14, 2012.

(Continued)

*Primary Examiner* — Mohammad L Rahman
(74) *Attorney, Agent, or Firm* — Holland & Hart, LLP

(57) ABSTRACT

A computer-implemented method for authenticating messages in a control area network is described. In one embodiment, a message identifier for a data message is ascertained. Each device is associated with one or more message identifiers. The data message is sent from a first device to a second device. The data message is associated with the ascertained message identifier. An authentication code computed by the first device is sent to the second device. The authentication code is sent by the first device in the data message or in an authentication message.

18 Claims, 9 Drawing Sheets

(56) References Cited

OTHER PUBLICATIONS

Groza et al., Secure broadcast with one-time signatures in controller area networks, International Journal of Mobile Computing and Multimedia Communications, vol. 5 Issue 3, Jul. 2013.

Herrewege et al., CANAuth—A Simple, Backward Compatible Broadcast Authentication Protocol for CAN bus, ECRYPT Workshop on Lightweight Cryptography, 2011.

Groza et al., Broadcast Authentication in a Low Speed Controller Area Network, E-Business and Telecommunications Communications in Computer and Information Science vol. 314, 2012.

\* cited by examiner

CONTROL AREA NETWORK AUTHENTICATION

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies may be desirable to anyone who uses and relies on computers.

With the wide-spread of computers and mobile devices has come an increased presence of devices using control area networks (CANs). Devices that use CANs include vehicles, trains, buses, medical equipment, etc. Currently, using a CAN with a device poses certain risks to the device, including malware infection and loss of control of the device.

SUMMARY

According to at least one embodiment, a computer-implemented method for authenticating messages in a control area network is described. In one embodiment, a data message from a sending device may be received by a receiving device. In some cases, the data message may include a controller area network (CAN) bus data frame. An authentication message from the sending device may be received by the receiving device. The authentication message may include an authentication code. The received data message may be authenticated by using a group key assigned to the receiving device to verify the authentication code.

In one embodiment, the group key assigned to the sending device may be assigned to the sending device based at least in part on a trust level associated with the sending device. The authentication code may be computed based at least in part on the group key assigned to the sending device. The group key assigned to the receiving device may be assigned to the receiving device based at least in part on a trust level associated with the receiving device. In some cases, a message identifier for the data transmission may be determined. A received counter value from the data message may be obtained. A local counter value for the message identifier may be determined. Upon determining that the local counter value for the determined message identifier varies from the received counter value, the data message may be ignored. The data message may be stored in a receive buffer. The stored data message in the receive buffer may be identified based at least in part on a message identifier included in the authentication message.

According to at least one embodiment, another computer-implemented method for authenticating messages in a control area network is described. In one embodiment, a message identifier for a data message may be ascertained. In some cases, the data message comprises a controller area network (CAN) bus data frame. Each device may be associated with one or more message identifiers. The data message may be sent from a first device to a second device. The data message may be associated with the ascertained message identifier. An authentication code computed by the first device may be sent to the second device. The authentication code may be sent by the first device in the data message or in an authentication message.

In one embodiment, from two or more trust levels, a trust level may be assigned to the first device, and a trust level may be assigned to the second device. In some cases, each device may be assigned the same trust level. Alternatively, each device may be assigned different trust levels. In some embodiments, each message identifier may be assigned to one of two or more message groups based on the trust levels of the devices that use each message identifier. For example, a particular message identifier may be assigned to a message group based on a device with the lowest trust level that uses that particular message identifier. In some cases, a group key may be assigned to a first message group. The group key may be shared among all devices given the right to use any message identifier assigned to the first message group. If both the first and second devices each had the right to use the ascertained message identifier, then both devices would share the group key associated with the ascertained message identifier, allowing each device to verify messages sent to one another.

In one embodiment, computing the authentication code may include computing a hash value based at least in part on a counter value and a group key assigned to a message group associated with the ascertained message identifier. Computing the authentication code may also include truncating the computed hash value. In some cases, the counter value comprises a local message counter and a session number, the session number being incremented each time the first device boots up. In one embodiment, the second device may attempt to verify the data message using a group key assigned to a message group associated with a message identifier used by the second device. If the second device is allowed to use the ascertained message identifier to generate message, then the second device may include the group key associated with the ascertained message identifier, by which the second device may verify the data message.

A computing device configured to authenticate messages in a control area network is also described. The computing device may include a processor and memory in electronic communication with the processor. The memory may store instructions that are executable by the processor to ascertain a message identifier for a data message, send the data message from a first device to a second device, and send, to the second device, an authentication code computed by the first device. The authentication code may be sent by the first device in the data message or in an authentication message. In some cases, each device may be associated with one or more message identifiers. In some configurations, the data message may be associated with the ascertained message identifier.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
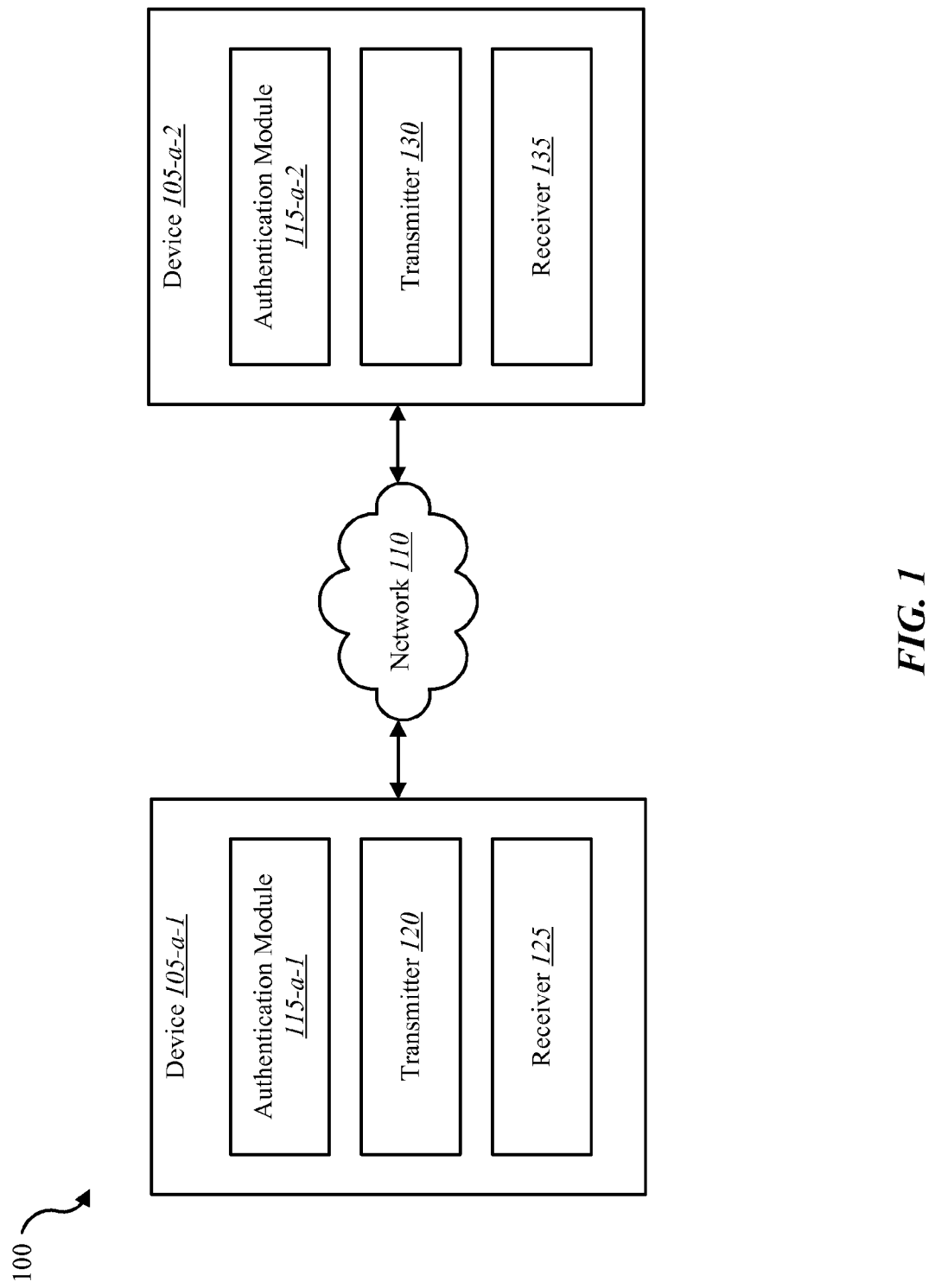
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to authenticating messages in a control area network. More specifically, the systems and methods described herein relate to authenticating messages in a control area network in association with one or more devices.

The controller area network (CAN) bus is a vehicle bus standard designed to allow microcontrollers and devices to communicate with each other without a host computer. The CAN bus is a message-based protocol originally designed for automotive applications, but also used in other areas such as aerospace, maritime, industrial automation, medical equipment, and the like. CAN bus is one of five protocols used in the on-board diagnostics (OBD)-II vehicle diagnostics standard. The OBD-II standard has been mandatory for all cars and light trucks sold in the United States since 1996, and the EOBD standard has been mandatory for all petrol vehicles sold in the European Union since 2001 and all diesel vehicles since 2004.

A typical modern automobile may have as many employ 50 or more electronic control units (ECU) for various subsystems, including individual control units for the engine, transmission, vehicle telematics, airbags, antilock braking/ABS, cruise control, electric power steering, audio systems, power windows, doors, mirror adjustment, battery systems, etc. Accordingly, a CAN bus may be used in vehicles to connect an engine control unit with a transmission control unit, etc.

The methods and systems described herein provide a solution to false data injection attacks in any systems that may employ a CAN bus via a group message authentication scheme. The methods and systems provide fundamental protection to critical components of the vehicle by using message authentication to filter out any false data injected onto the CAN bus and isolating the impact of a break-in by preventing a compromised ECU (e.g., telematics, etc.) from influencing any other ECU. It is noted that the word telematics derives from the words TELEcommunications and inforMATICS. Accordingly, telematics may include global positioning systems (GPS), integrated hands-free systems for cell phones, vehicle tracking, wireless safety communications, automatic driving assistance systems, and mobile data communication systems such as 802.11p from the 802.11 wireless family, also referred to as Wireless Access for the Vehicular Environment (WAVE).

Unlike conventional end-point protection on the telematics, the methods and systems described herein may be configured to resist zero-day attacks. In comparison, conventional end-point protection on the telematics may not be able to resist any kind of attacks (including zero-day attacks), considering the telematics may be integrating more applications and providing more external interfaces. The methods and systems described herein provide security to critical components of the vehicle even in worst-case scenarios where a successful attack compromises an ECU (e.g., telematics) and the attacker gains write access to the CAN bus. As for the conventional end-point protection, if an attack is able to circumvent security mechanisms of the end-point protection, the attacker able to completely control the vehicle. The methods and systems described herein prevent attacks launched from a compromised OBD-II device (such as a PassThru device, smart phone, etc.), which cannot be addressed by the conventional end-point protection.

The methods and systems described herein are distinguished from conventional methods in at least the following ways: (1) a minimum number of keys, or shared group keys, may be used, which significantly reduces the complexity of distributing and managing keys; (2) minimal computational time/delay is used on each message, where only one hash function computational may be used per sent/received message; (3) minimal communication overhead is incurred on each message, where at most only one additional message, an authentication message, is sent in addition to a data message, where the additional message may include a truncated hash value (if space allows, at least a portion of the payload of the authentication message may be included in a data message); (4) minimal message processing delay is incurred with each message sent, as a sender ECU may send out a message the moment the message is constructed; and (5) due to minimal communication overhead, at most only one message fragment (i.e., the authentication message) is sent in addition to a data message, thus, a receiver ECU may verify each data message the moment the authentication information arrives at the receiver ECU. In one embodiment, a unique key may be assigned to each group. In some configurations, to minimize the number of keys used, a single shared group key may be used when two groups are used (e.g., $G_L$ and $G_H$). In one example, two shared group keys may be used when there are three groups (e.g., $G_L$, $G_M$, and $G_H$). In some embodiments, distribution of the one or more shared group keys may be implemented at the time of manufacturing the ECUs. Additionally, or alternatively, the distribution may occur when an old ECU is replaced with a new one. In one example, a PassThru device connected to an OBD port may be used to distribute the keys and/or a remote authority of original equipment manufacturing (OEM) may remotely upload the keys to the ECUs.

Each ECU may be authorized to use one or more message identifiers (IDs). While one ECU may use two or more message IDs, another ECU may use only one message ID. Two different ECUs may use the same message ID. Thus, the single message ID used by the other ECU may be the same as one of the message IDs used by the one ECU. In one embodiment, each ECU may be assigned a trust level from two or more trust levels that are determined according to the ease with which an ECU may be compromised. For example, ECUs with easy-to-access interfaces, such as telematics, may be assigned a low trust level, ECUs with limitedaccess interface, such as a tire sensing module, may be assigned a medium trust level, and ECUs without any external interfaces may be assigned a high trust level. In some embodiments, each message ID may be assigned to a message group based on which ECUs are allowed to use which message IDs. Thus, the trust level of a particular message ID may be determined by the lowest trust level of an ECU that is entitled to use that particular ID.

In one embodiment, for each outgoing CAN message, the sending ECU may compute a hash value using the shared group key and a counter. The sending ECU may truncate the hash value into a shorter string. The truncated hash value may be referred to as an authentication code. The counter may be used to resist a replay attack. The counter may include a local message counter and a session number. Each time a particular sending ECU sends a message, the sender ECU may increment its local message counter. To resist replay attacks, a session number may be used to index each driving session. At the time the vehicle is manufactured, the session number may be initialized to 0. Subsequently, each time the vehicle is started, the session number may be incremented. In some embodiments, the initialization of a session number may initiate key distribution. In some cases, the next-to-use session number may be stored on a flash memory of each ECU. Upon boot-up, an ECU may read the session number from the flash memory into the main memory, and update the session number on the flash memory by incrementing it.

For each outgoing CAN message, the sender ECU may send a data message using the original protocol, and immediately after sending the data message, the sender ECU may send a follow-up authentication message using the same message ID used by the data message. In some cases, the sender ECU may include at least a portion of the contents of the authentication message (e.g., authentication code) in the data message. There are at least four ways to transmit the authentication code depending on the existing applications developed on top of the CAN. First, if there is open space left in the data field of the data message, the sending ECU may use this space to carry the authentication code (i.e., the truncated hash value). Second, if all the data field is occupied, but the deployed CAN protocol supports the extended identity field, the sending ECU may use this extended identity field to carry the authentication code. Third, if neither of the above methods are allowed, but the deployed CAN protocol supports the extend data field (i.e., data segmentation), the sending ECU may use an extended CAN message to carry the authentication code. Lastly, if none of the above options are available, the sending ECU may use a separate authentication message to send the authentication code. Thus, to generate an authentication message, the sender ECU with a particular ECU ID may perform one or more of the following functions: (1) the sender ECU may look up which message group a message belongs to based on a message ID; (2) if the group is the lowest group, $G_L$, the sender ECU may send out the data message immediately without sending a follow-up authentication message (e.g., in the case where the lowest group is not assigned a group key); (3) otherwise, for messages belonging to groups higher than the lowest group and for situations where the lowest group is assigned a key, the sender ECU may compute a message authentication code (MAC) based on at least one of a shared group key, a local counter, and/or a session number.

Upon receiving a data message, the receiving ECU may store the data message in a receiver buffer, waiting for the corresponding authentication message to arrive. Upon receiving an authentication message, the receiving ECU may performs a series of verification operations. For example, upon receiving a data message and the corresponding authentication code, the receiving ECU may use its shared group key to verify the message. If the authentication code is invalid, the receiving ECU may discard the message. In some embodiments, each receiving ECU may locally maintain a rounds counter value for each message ID and sender ECU combination. The rounds counter value may be configured to count how many times the local counter of a given message ID from a particular sender ECU reaches a predetermined maximum value (e.g., a maximum value of 255). Note that the present systems and methods may use a local counter and a rounds counter per message ID per sender ECU because two or more ECUs may use the same message ID to send messages. As a result, upon sending a message sender ECU may increment its local counter and if the local counter is equal to a predetermined maximum value (e.g., 255), round counter may be incremented, and local counter may be reset to 0.

FIG. 1 is a block diagram illustrating one embodiment of an environment 100 in which the present systems and methods may be implemented. In some embodiments, the systems and methods described herein may be performed on a single device (e.g., device 105-*a*-1 or device 105-*a*-2) or on two or more devices such as device 105-*a*-1 and device 105-*a*-2. As depicted, environment 100 may include device 105-*a*-1, network 110, and device 105-*a*-2. Although only two devices are depicted in FIG. 1, it is understood that environment 100 may include 2 or more devices. Examples of device 105-*a* include electronic control units (ECUs), any device used in a CAN bus environment, mobile computing devices, smart phones, personal computing devices, computers, servers, and the like.

In some cases, device 105-*a*-1 may connect to device 105-*a*-2 via network 110. Examples of network 110 include any combination of control area networks (CAN), local area networks (LAN), wide area networks (WAN), virtual private networks (VPN), wireless networks (using 802.11, for example), cloud networks, cellular networks (using 3G and/or LTE, for example), etc. In some configurations, the network 110 may include the internet. Thus, network 110 may include one or more gateway devices, access points, routers, switches, dynamic host configuration protocol (DHCP) servers, etc., that enable computing devices to connect to the internet.

Authentication module 115-*a*-1, 115-*a*-2 may be located on device 105-*a*-1 and/or device 105-*a*-2. Although devices 105-*a* are both depicted including module 115-*a*, in some embodiments, one of the depicted devices may not include an authentication module 115-*a*. In some cases, device 105-*a*-1 may include an application that allows device 105-*a*-1 to interface with the authentication module 115-*a*-2 located on device 105-*a*-2. In some embodiments, both device 105-*a*-1 and device 105-*a*-2 may include at least a portion of authentication module 115-*a*, where at least a portion of the functions of authentication module 115-*a* are performed on device 105-*a*-1 and another portion of the functions are performed on device 105-*a*-1. In some cases, any combination of the functions of authentication module 115-a are performed concurrently and/or separately on device 105-a-1 and device 105-a-2.

As depicted, device 105-a-1 may include a transmitter 120 and a receiver 125. Likewise, device 105-a-2 may include a transmitter 130 and a receiver 135. Accordingly, authentication module 115-a-1 may generate a message, transmitter 120 may send the generated message, and receiver 135 of device 105-a-2 may receive the message. Additionally, or alternatively authentication module 115-a-2 may generate a message, transmitter 130 may send the generated message, and receiver 125 of device 105-a-1 may receive the message. Accordingly, device 105-a-1 may send a data message to device 105-a-2. Device 105-a-1 may include authentication information with the data message to allow device 105-a-2 to authenticate the received data message. Thus, authentication module 115-a may be configured to authenticate messages in a control area network in relation to a sending device (e.g., device 105-a-1 or device 105-a-2) and a receiving device (e.g., device 105-a-2 or device 105-a-1). Further details regarding the authentication module 115-a are discussed below with regards to FIGS. 2 and/or 3.

Figure 2:
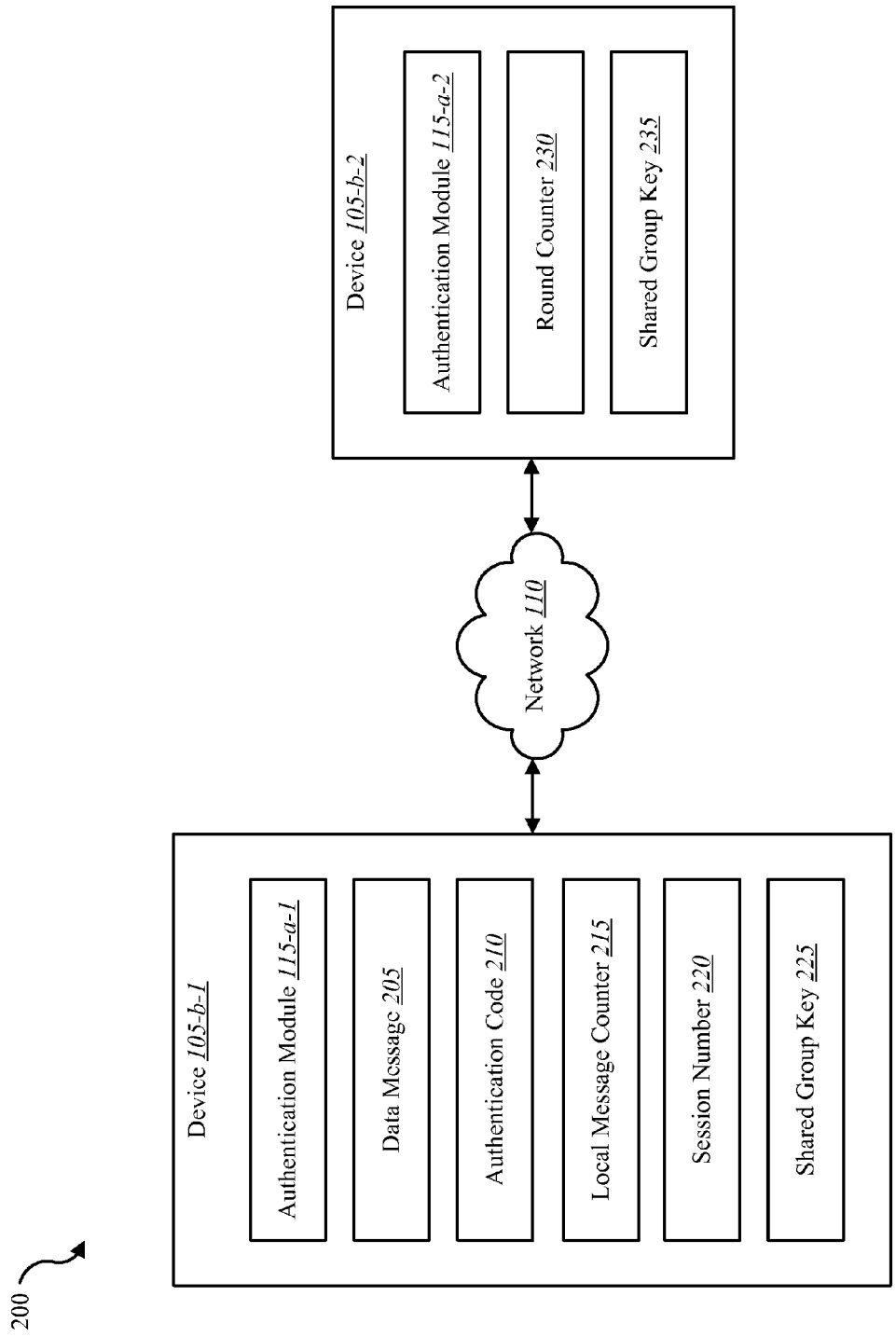
FIG. 2 is a block diagram illustrating another embodiment of an environment in which the present systems and methods may be implemented.

FIG. 2 is a block diagram illustrating another embodiment of an environment 200 in which the present systems and methods may be implemented. As depicted, environment 200 may include device 105-b-1, network 110, and device 105-b-2. Devices 105-b may be examples of devices 105-a depicted in FIG. 1. Device 105-b-1 may include authentication module 115-a-1, data message 205, authentication code 210, local message counter 215, session number 220, and shared group key 225. Device 105-b-2 may include authentication module 115-a-2, round counter 230, and shared group key 235.

In one embodiment, device 105-b-1 may be assigned a trust level, and device 105-b-2 may be assigned a trust level. The assigned trust levels may be the same or different. Device 105-b-1 may generate a data message intended for device 105-b-2 (e.g., data message 205). The data message 205 may be associated with a message identifier, which may be assigned to a message group according to the device with the lowest trust level that is entitled to use that message identifier. Device 105-b-1 may send data message 205 to device 105-b-2 along with authentication code 210. Device 105-b-1 may generate authentication code 210 based on the shared group key 225 assigned to device 105-b-1 and a counter. The shared group key 225 may be based on the message group to which the message identifier is assigned. The counter may include local message counter 215 and session number 220. Local message counter 215 may be incremented each time device 105-b-1 sends a message. Session number 220 may be incremented each time device 105-b-1 is booted. Device 105-b-2 may receive data message 205 and store data message 205 in a storage device. Device 105-b-2 may verify the message based on the shared group key 235 assigned to device 105-b-2. In some embodiments, device 105-b-2 may increment round counter 230 each time local message counter 215 of device 105-b-1 reaches a predetermined maximum value (e.g., when local message counter 215 reaches 255).

Figure 3:
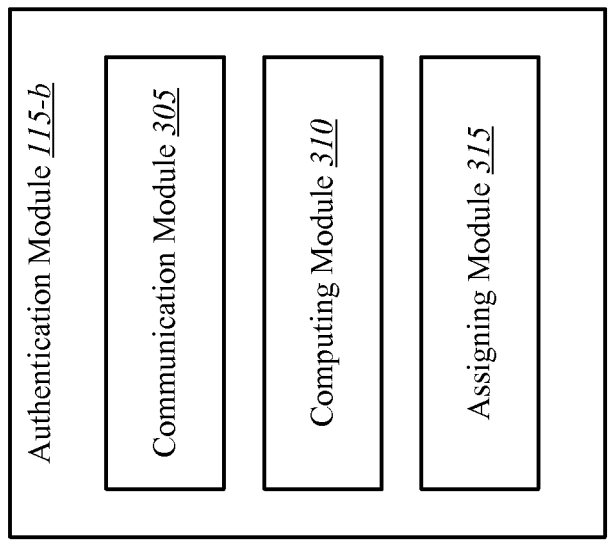
FIG. 3 is a block diagram illustrating one example of an authentication module.

FIG. 3 is a block diagram illustrating one example of an authentication module 115-b. The authentication module 115-b may be one example of the authentication module 115 depicted in FIGS. 1 and/or 2. As depicted, the authentication module 115-b may include a communication module 305, a computing module 310, and an assigning module 315.

In one embodiment, communication module 305 may ascertain a message identifier for a data message. Each device that sends/receives messages may be associated with one or more message identifiers. For example, a sending device may use two or more message identifiers to send messages, while a receiving device may use only a single message identifier to send messages. In one embodiment, communication module 305 may be configured to send a data message to a receiving device. The data message may be associated with the ascertained message identifier. In some configurations, communication module 305 may send, to the receiving device, an authentication code. The computing module 310 may compute the authentication code. In one embodiment, communication module 305 may send the authentication code in the data message. Alternatively, communication module 305 may send the authentication code in an authentication message separate from the data message.

In one configuration, the data message includes a controller area network (CAN) bus data frame. Thus, if there is open space left in the data field of the data message, the sending device may use this space to carry the authentication code (e.g., a truncated hash value). Alternatively, if all the data field is occupied, but the deployed CAN protocol supports the extended identity field, the sending device may use this extended identity field to carry the authentication code. Alternatively, if neither of the above methods are allowed, but the deployed CAN protocol supports the extend data field (i.e., data segmentation), the sending device may use an extended CAN message to carry the authentication code. Alternatively, if none of the above options are available, the sending device may use a separate authentication message to send the authentication code.

In some embodiments, assigning module 315 may assign, from two or more trust levels, a trust level to the sending device. Assigning module 315 may assign a trust level to the receiving device. In some cases, the trust level assigned to the sending device (e.g., device 105-a-2) may be the same trust level assigned to the receiving device (e.g., device 105-a-1). For example, assuming only two trust levels, both the sending and receiving devices may be assigned to a high trust level. One or more other device may be assigned a high trust level. Additionally, one or more different devices may be assigned to a low trust level. In some cases, the trust level assigned to the sending device may differ from the trust level assigned to the third device. Accordingly, assuming only two trust levels, the sending device may be assigned to a high trust level among other devices assigned to the high trust level, and the receiving device may be assigned to a low trust level among other devices assigned to the low trust level.

In one embodiment, assigning module 315 may assign each message identifier to one of two or more message groups. In some cases, a particular message identifier may be assigned to a message group based on a device with the lowest trust level that uses that particular message identifier. In one embodiment, assigning module 315 may assign a group key to a first message group. The group key may be shared among all devices given the right to use any message identifier assigned to the first message group. In one embodiment, the number of message groups is equivalent to the number of trust levels. In some embodiments, the number of group keys is at least equivalent to the number of message groups. For example, if there are three message groups, then there may be at least three group keys. Alternatively, the number of group keys is at least one less than the number of message groups. For example, if there are four message groups, then there may be three or less group keys.

In an example that uses high, medium, and low trust levels and high, medium, and low message groups, if a first device assigned to the high trust level uses message identifier X and a second device assigned to the low trust level also uses message identifier X, then message identifier X will be assigned to the low message group. Likewise, if a first device assigned to the high trust level uses message identifier Y and a second device assigned to the medium trust level also uses message identifier Y, then message identifier Y will be assigned to the medium message group. Assigning of message identifiers to message groups, etc., is discussed in further detail with regards to FIG. 4.

In one embodiment, computing the authentication code may include computing module 310 computing a hash value based at least in part on a counter value and a group key assigned to a message group associated with the ascertained message identifier. The counter value may include a local message counter and a session number. The session number may be incremented each time the sending device boots up (e.g., each time a vehicle with the device is started). In some cases, computing module 310 may truncate the computed hash value to generate the authentication code. For example, to generate an authentication code, the sending device with a particular device ID may perform one or more of the following functions: the sending device may look up which message group a data message belongs to based on the data message being tied to a message ID. In some embodiments, every message group may be assigned a unique group key. Alternatively, all but the lowest message group may be assigned a group key. Thus, if the group is the lowest group, e.g., $G_L$, and the lowest group is not assigned a group key, then the sending device may send out the data message immediately without sending an authentication code. Accordingly, the receiving device may verify the received message based on the message ID included with the message, and other identifying data besides the authentication code. Otherwise, for each data message associated with a message ID belonging to a message group assigned a group key, the sending device may compute a message authentication code (MAC) based on at least one of the following: a shared group key, a local counter, and a session number.

In some embodiments, the receiving device may attempt to verify the data message using a group key assigned to a message group associated with a message identifier used by the receiving device. For example, if the sending device sends a data message with message identifier Z, and message identifier Z belongs to message group $G_M$, and message group $G_M$ is assigned group key $K_M$, then the sending device may generate an authentication code based at least on group key $K_M$. Then, if the receiving device also has access to group key $K_M$ (e.g., because the receiving device is permitted to send messages using message identifier Z), then the receiving device may be enabled to authenticate the data message as being valid by verifying the data message using group key $K_M$. Note, that if the receiving device does not have access to group key $K_M$, then the receiving device would not be able to authenticate the data message, and the data message would be discarded. Likewise, if the receiving device receives a data message from a malicious entity, then the received data message would not include a proper authentication code, and accordingly, the data message would be discarded by the receiving device.

In some configurations, in association with a receiving device, communication module 305 may store the received data message in a receive buffer, enabling the receiving device to identify the stored data message in the receive buffer based at least in part on a message identifier included with the authentication code. In some cases, communication module 305 may obtain a received counter value from the data message. The communication module 305 may determine an expected counter value for the received message identifier and, upon determining that the expected counter value for the determined message identifier varies from the received counter value, the communication module 305 may discard the received data message. In some cases, the computing module 310 may verify the data message using a group key assigned to the receiving device to verify a received authentication code, discarding any received message that is determined to be associated with an invalid authentication code.

Figure 4:
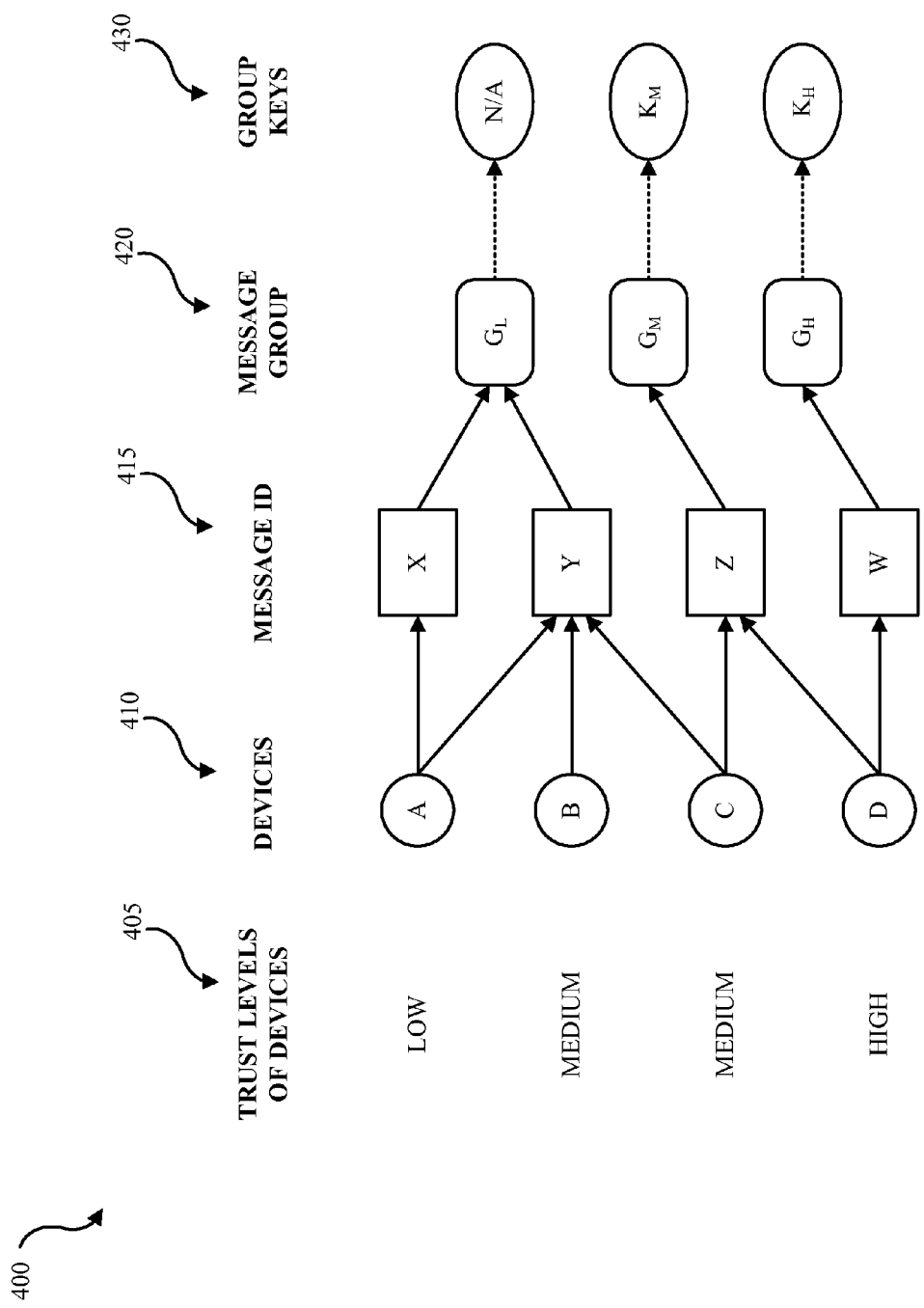
FIG. 4 is a block diagram illustrating another embodiment of the present systems and methods.

FIG. 4 is a block diagram illustrating a block diagram 400 illustrating the present systems and methods. As depicted, the block diagram 400 includes a trust levels of devices column 405, a devices column 410, a message ID column 415, a message group column 420, and a group keys column 430.

As described above, the trust level of a message ID is determined by the lowest trust level of a device that is entitled to use that message ID. As depicted in FIG. 4, device A under column 410 is authorized to use message identifier X and message identifier Y of column 415. Device B of column 410 is authorized to use message identifier Y of column 415. Device C of column 410 is authorized to use message identifier Y and Z of column 415. Device D is authorized to use message identifier Z and W of column 415. Device A is assigned a low trust level from column 405, devices B and C are assigned a medium trust level from column 405, and device D is assigned a high trust level from column 405. In some cases, trust level may be assigned based on the accessibility, type of interface, or whether an interface is associated with a particular device. Accordingly, a trust level may be assigned based on how a determination of how easily a device may be accessed by a malicious entity. Since message identifier X is associated with a device with a low trust level, device A, message identifier X is assigned to the low group, $G_L$, of column 420, which is associated with the low trust level. Each message identifier is assigned a trust level based on the device with the lowest trust level that uses that message identifier. It would not matter were message identifier X also associated with device B, which is assigned a medium trust level. Since message identifier X is associated with a device assigned a low trust level, message identifier X is assigned to the low message group. Accordingly, since message identifier Y is also associated with device A, message identifier Y is also assigned to group $G_L$ of column 420. Since message identifier Z is associated with a device with a medium trust level, device C, message identifier Z is assigned to group $G_M$ of column 420, which is associated with the medium trust level. Lastly, since message identifier W is associated with a device with no lower a trust level than a high trust level, device D, message identifier W is assigned to group $G_H$ of column 420, which is associated with the high trust level. In some embodiments, at least one message group may be assigned a symmetric key, the key being shared among all devices that have the right to use any message ID in from that message group. In one embodiment, each message group is assigned a group key. Alternatively, in some configurations, the total number of keys assigned is one less than the total number of message groups. Thus, if there are three groups, as illustrated in FIG. 4, then two keys may be assigned, the lowest group not being assigned a key. In some cases, when there are only two groups, then only one key may be assigned, the higher group using the key and the lower group not using a key. In some configurations, a message from the lowest group may use a message identifier, local message counter, session number, and/or device ID to authenticate a message. As illustrated, the two highest message groups, $G_M$ and $G_H$ from column 420, may each be assigned a unique group key, $K_M$ and $K_H$, respectively, while the lowest message group, $G_L$, is not assigned a group key. Accordingly, data messages generated in the two highest message groups may be authenticated by generating an authentication code based on a respective group key. The receiving device may receive the data message and the authentication code, and may authenticate the data message via a group key assigned to the receiving device.

Figure 5:
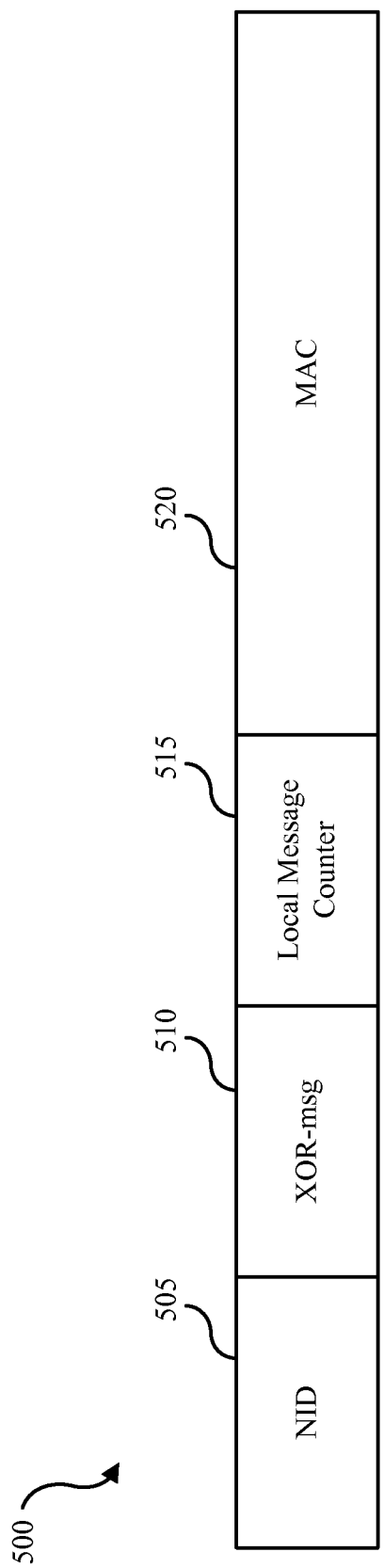
FIG. 5 is a block diagram illustrating one embodiment of a data frame which may be implemented in the present systems and methods.

FIG. 5 is a block diagram illustrating another embodiment of a data frame 500 which may be implemented in the present systems and methods. In some embodiments, data frame 500 may illustrate the payload of an authentication message. The data frame 500 may include a node identifier (NID) 505, a XOR message 510, a local message counter 515, and a Message Authentication Code (MAC) 520.

For each outgoing data message, the sending device may first send a data message, and then the sending device may send a follow-up authentication message that uses the same message ID used by the data message. In some cases, the sending device may send the authentication message immediately after sending the data message. The authentication message may include the elements depicted in the data frame 500. The NID 505 may include data identifying the particular device that sends the data message and the authentication code. The identifying data may be unique to the sending device. The NID 505 may include 8 bits. The combination of the NID 505 and the message ID may uniquely identify each sending device in the environment depicted in FIGS. 1, 2, and/or 3.

XOR-msg 510 may include an 8-bit data field and may denote the XOR value of the data message's data field. XOR-msg 510 may be used together with a message ID to match the data message corresponding to the authentication code in case there are multiple messages with the same message ID in a receiving buffer.

As described above, a sending device may compute a hash value using a shared group key and a counter. The counter may be based on any combination of a local counter value, a session number, and a round counter value. The sending device may truncate the hash value into a shorter string to generate an authentication code, or Message Authentication Code (MAC). Thus, a remaining portion of the data frame 500, as illustrated, may include the MAC 520.

Figure 6:
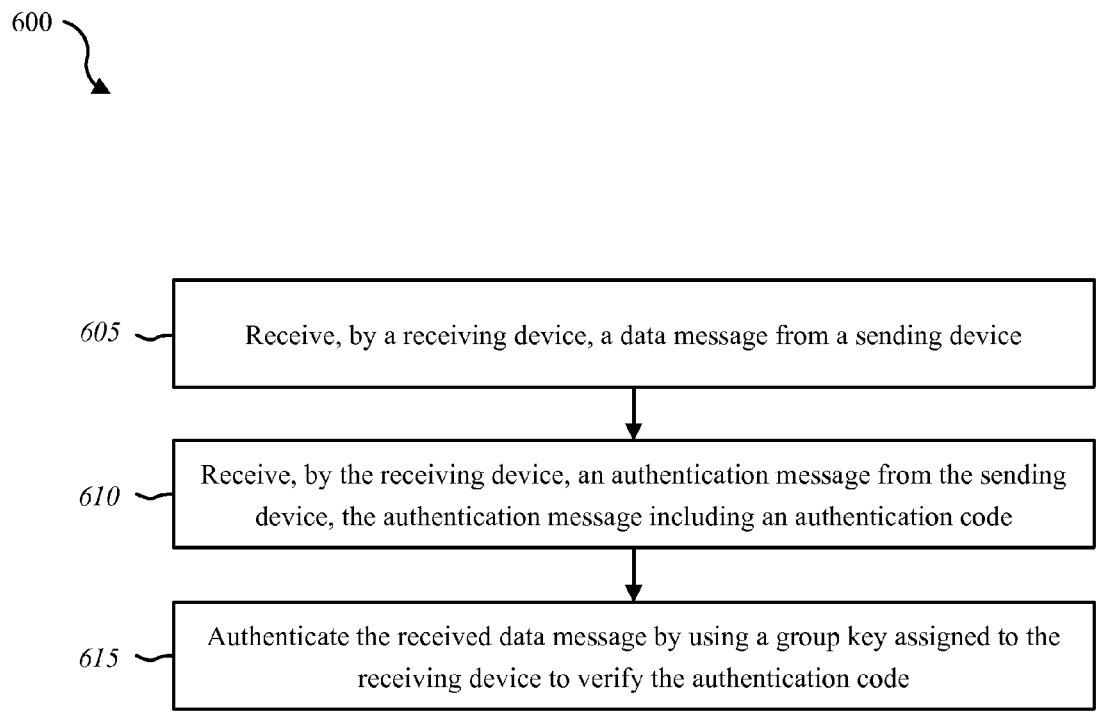
FIG. 6 is a flow diagram illustrating one embodiment of a method for authenticating messages in a control area network.

FIG. 6 is a flow diagram illustrating one embodiment of a method 600 for authenticating messages in a control area network. In some configurations, the method 600 may be implemented by the authentication module 115 illustrated in FIGS. 1, 2, and/or 3.

At block 605, a data message from a sending device may be received by a receiving device. At block 610, an authentication message from the sending device may be received by the receiving device. The authentication message may include an authentication code computed by the sending device. At block 615, the received data message may be authenticated by using a group key assigned to the receiving device to verify the authentication code.

Figure 7:
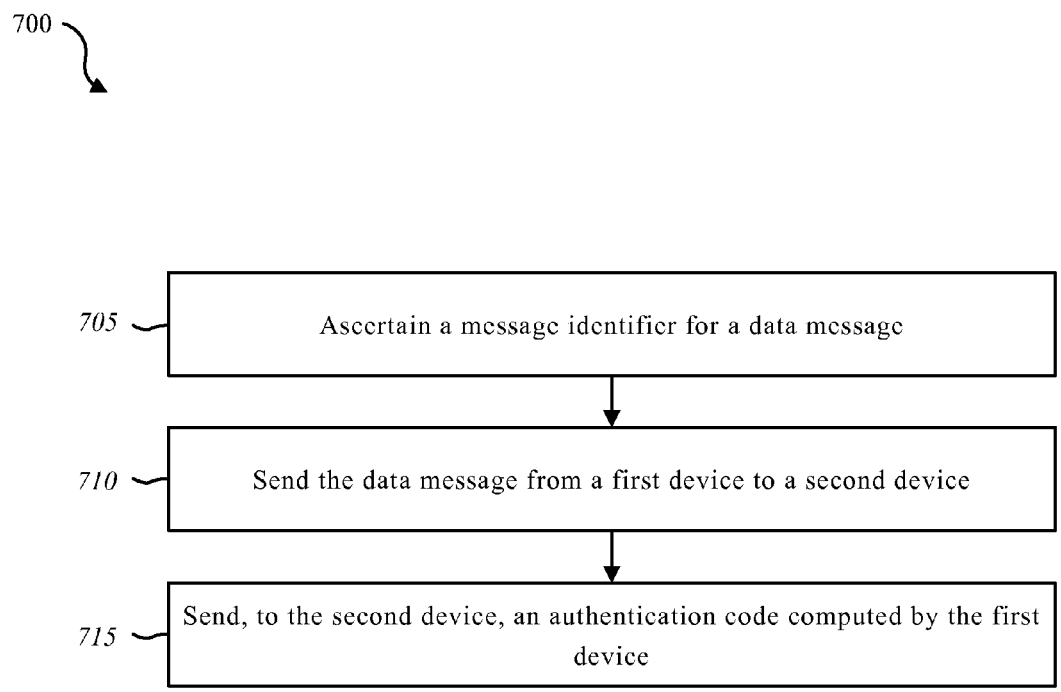
FIG. 7 is a flow diagram illustrating one embodiment of a method for group message authentication.

FIG. 7 is a flow diagram illustrating another embodiment of a method 700 for authenticating messages in a control area network. In some configurations, the method 700 may be implemented by the authentication module 115 illustrated in FIGS. 1, 2, and/or 3.

At block 705, a message identifier may be ascertained for a data message. Each device may be associated with one or more message identifiers. In some cases, the data message may include a controller area network (CAN) bus data frame. At block 710, the data message may be sent from a first device to a second device. The data message may be associated with the ascertained message identifier. At block 715, an authentication code computed by the first device may be sent to the second device. The authentication code may be sent by the first device in the data message or in an authentication message.

Figure 8:
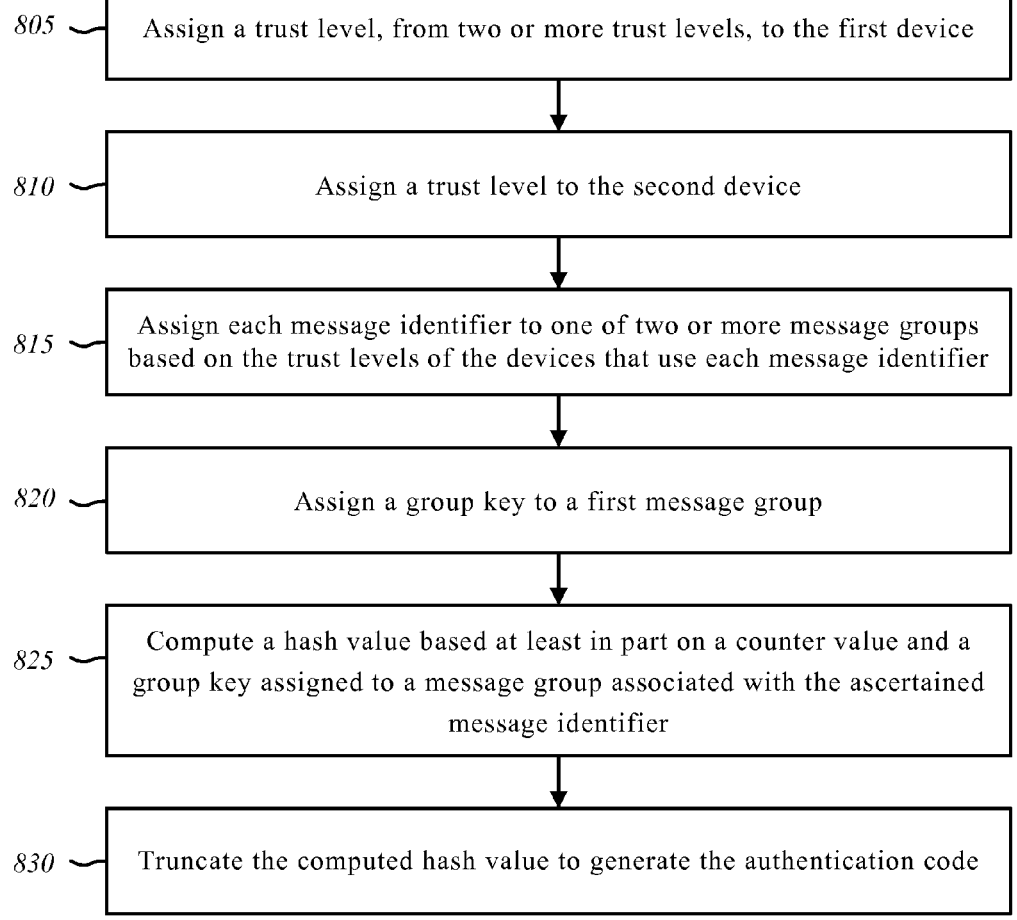
FIG. 8 is a flow diagram illustrating another embodiment of a method for group message authentication.

FIG. 8 is a flow diagram illustrating one embodiment of a method 800 for group message authentication. In some configurations, the method 800 may be implemented by the authentication module 115 illustrated in FIGS. 1, 2, and/or 3.

At block 805, a trust level, from two or more trust levels, may be assigned to the first device. At block 810, a trust level may be assigned to the second device. At block 815, each message identifier may be assigned to one of two or more message groups based on the trust levels of the devices that use each message identifier. For example, a particular message identifier may be assigned to a message group based on a device with the lowest trust level that uses that particular message identifier. At block 820, a group key may be assigned to a first message group. The group key may be shared among all devices given the right to use any message identifier assigned to the first message group. At block 825, a hash value may be computed based at least in part on a counter value and a group key assigned to a message group associated with the ascertained message identifier. In some cases, the counter value comprises a local message counter and a session number, the session number being incremented each time the first device boots up. At block 830, the computed hash value may be truncated to generate the authentication code. In one embodiment, the second device attempts to verify the data message using a group key assigned to a message group associated with a message identifier used by the second device. In some embodiments, the receiving device may store the received data message in a receive buffer, enabling the receiving device to identify the stored data message in the receive buffer based at least in part on a message identifier included with the authentication code. In some cases, the receiving device may obtain a received counter value from the data message. The receiving device may determine a local counter value for the message identifier and, upon determining that the local counter value for the determined message identifier varies from the received counter value, the receiving device may discard the received data message. In some cases, the receiving device may verify the data message using a group key assigned to the receiving device, discarding any received message that has an invalid authentication code.

Figure 9:
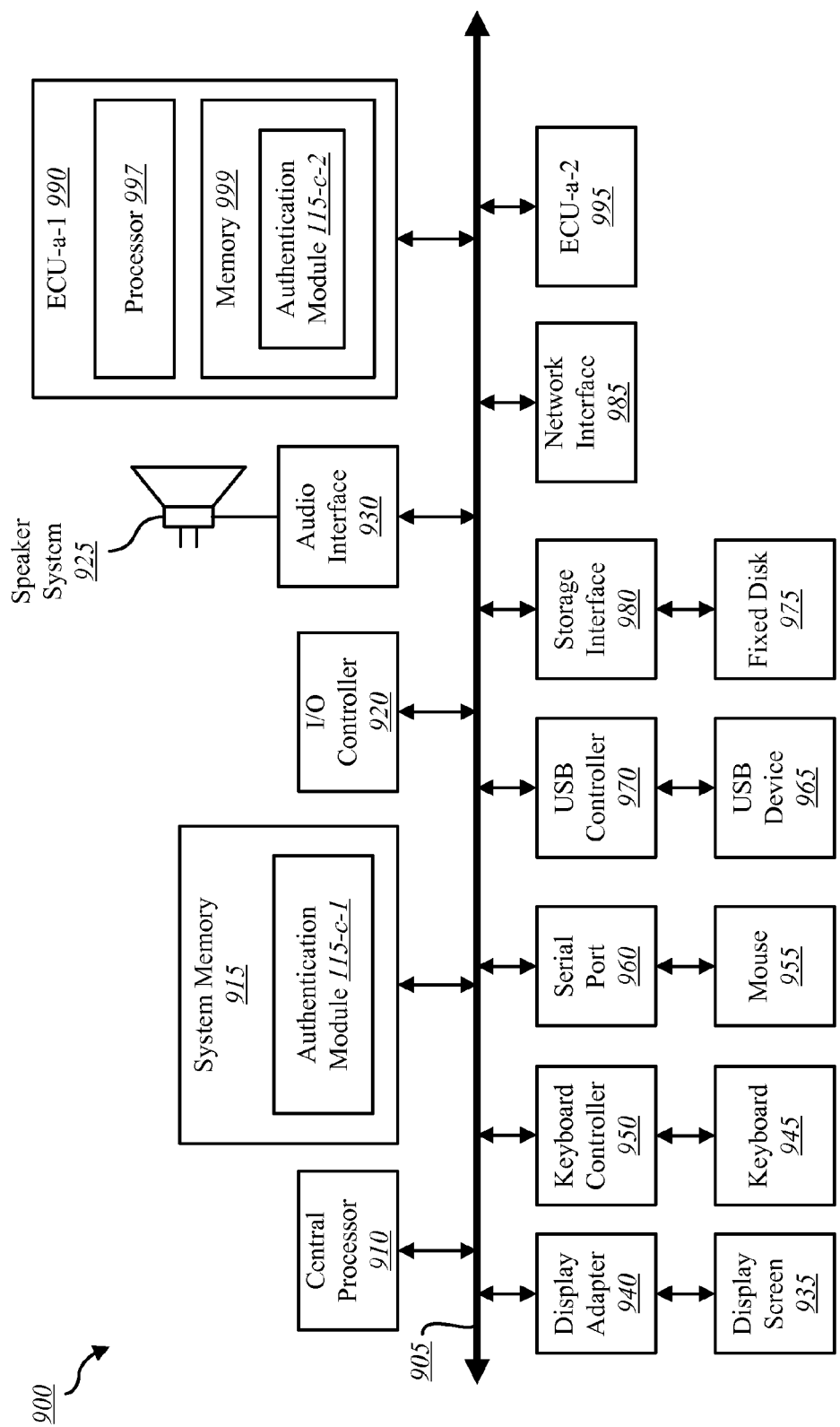
FIG. 9 depicts a block diagram of a computer system suitable for implementing the present systems and methods.

FIG. 9 depicts a block diagram of a computer system 900 suitable for implementing the present systems and methods. Computer system 900 includes a bus 905 which interconnects major subsystems of computer system 900, such as a central processor 910, a system memory 915 (typically RAM, but which may also include ROM, flash RAM, or the like), an input/output controller 925, an external audio device, such as a speaker system 925 via an audio output interface 930, an external device, such as a display screen 935 via display adapter 940, a keyboard 945 (interfaced with a keyboard controller 950) (or other input device), multiple USB devices 965 (interfaced with a USB controller 970), and a storage interface 980. Also included are a mouse 955 (or other point-and-click device) connected to bus 905 through serial port 960, a network interface 985 (coupled directly to bus 905), and one or more electrical control units (ECUs) such as ECU-a-1 990 and ECU-a-2 995. In some embodiments, bus 905 may include a control area network (CAN) bus.

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the authentication module 115-c-1 to implement the present systems and methods may be stored within the system memory 915. Applications resident with computer system 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of computer system 900, can connect to a standard computer readable medium for storage and/or retrieval of information, such as a fixed disk drive 975. Fixed disk drive 975 may be a part of computer system 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in a non-transitory computer-readable medium such as one or more of system memory 915 or fixed disk 975. The operating system provided on computer system 900 may be iOS®, MS-DOS®, MS-WINDOWS®, OS/2®, UNIX®, LINUX®, or another known operating system.

In automotive electronics, ECUs 990 and 995 include any embedded system that controls one or more of the electrical system or subsystems in a motor vehicle. Types of ECU include electronic/engine control module (ECM), powertrain control module (PCM), transmission control module (TCM), brake control module (BCM or EBCM), central control module (CCM), central timing module (CTM), general electronic module (GEM), body control module (BCM), suspension control module (SCM), control unit, or control module. ECUs 990 and 995 may include at least one or more of the following: embedded software, a microcontroller, clocks, memory and/or storage, input connections, supply voltage, digital inputs, analog inputs, output connections, outputs, relay drivers, H bridge drivers, injector drivers, communication links, serial connectors, USB connectors, and a housing. As depicted, ECU-a-1 990 may include a processor 997 and memory 999. The memory 999 may include authentication module 115-c-2. Accordingly, the methods and systems described herein may be performed by processor 997 of ECU-a-1 990 executing instructions of authentication module 115-c-2 stored in memory 999. Although not depicted, ECU-a-2 995 may also include a processor, memory, and an authentication module, by which ECU-a-2 995 may perform one or more of the functions described herein.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for authenticating messages, comprising:
   receiving, by a receiving device, a data message from a sending device, wherein each receiving and sending device is assigned one of two or more trust levels;
   receiving, by the receiving device, an authentication message from the sending device, the authentication message comprising an authentication code;
   determining a message identifier for the data transmission, wherein each receiving device is associated with at least one of two or more message identifiers, the two or more message identifiers being assigned to one of two or more message groups, wherein a particular message identifier is assigned to one of the two or more message groups based on a device with the lowest trust level among the receiving and sending devices that use that particular message identifier;
   authenticating the received data message by using a group key assigned to the receiving device to verify the authentication code.

2. The method of claim 1, wherein:
   the group key assigned to the sending device is assigned to the sending device based at least in part on a trust level associated with the sending device, wherein the authentication code is computed based at least in part on the group key assigned to the sending device; and
   the group key assigned to the receiving device is assigned to the receiving device based at least in part on a trust level associated with the receiving device.

3. The method of claim 1, further comprising:
   obtaining a received counter value from the data message;
   determining a local counter value for the message identifier; and
   upon determining that the local counter value for the determined message identifier varies from the received counter value, ignoring the data message.

4. The method of claim 1, further comprising:
   storing the data message in a receive buffer; and
   identifying the stored data message in the receive buffer based at least in part on a message identifier included in the authentication message.

5. The method of claim 1, wherein the data message comprises a controller area network (CAN) bus data frame.

6. A computer-implemented method for authenticating messages, comprising:
   ascertaining a message identifier for a data message, wherein each receiving and sending device is associated with at least one of two or more message identifiers, wherein each receiving and sending device is assigned one of two or more trust levels;
   assigning each of the two or more message identifiers to one of two or more message groups, wherein a particular message identifier is assigned to one of the two or more message groups based on a device with the lowest trust level among the receiving and sending devices that use that particular message identifier;
   sending the data message from a first device to a second device, the data message being associated with the ascertained message identifier; and
   sending, to the second device, an authentication code computed by the first device, the authentication code being sent by the first device in the data message or in an authentication message.

7. The method of claim 6, further comprising:
   assigning a trust level, from two or more trust levels, to the first device; and
   assigning a trust level to the second device.

8. The method of claim 6, further comprising:
   assigning a group key to a first message group, the group key being shared among all devices given the right to use any message identifier assigned to the first message group.

9. The method of claim 6, wherein computing the authentication code comprises:
   computing a hash value based at least in part on a counter value and a group key assigned to a message group associated with the ascertained message identifier; and
   truncating the computed hash value.

10. The method of claim 9, wherein the counter value comprises a local message counter and a session number, the session number being incremented each time the first device boots up.

11. The method of claim 6, wherein the second device attempts to verify the data message using a group key assigned to a message group associated with a message identifier used by the second device.

12. The method of claim 6, wherein the data message comprises a controller area network (CAN) bus data frame.

13. A computing device configured to authenticate messages, comprising:
    a processor;
    memory in electronic communication with the processor;
    instructions stored in the memory, the instructions being executable by the processor to:
       ascertain a message identifier for a data message, wherein each receiving and sending device is associated with at least one of two or more message identifiers, wherein each receiving and sending device is assigned one of two or more trust levels;
       assign each of the two or more message identifiers to one of two or more message groups, wherein a particular message identifier is assigned to one of the two or more message groups based on a device with the lowest trust level among the receiving and sending devices that use that particular message identifier;
       send the data message from a first device to a second device, the data message being associated with the ascertained message identifier; and
       send, to the second device, an authentication code computed by the first device, the authentication code being sent by the first device in the data message or in an authentication message.

14. The computing device of claim 13, wherein the instructions are executable by the processor to:
    assign a trust level, from two or more trust levels, to the first device; and
    assign a trust level to the second device.

15. The computing device of claim 13, wherein the instructions are executable by the processor to:
    assign a group key to a first message group, the group key being shared among all devices given the right to use any message identifier assigned to the first message group.

16. The computing device of claim 13, wherein the instructions to compute the authentication code are executable by the processor to:

compute a hash value based at least in part on a counter value and a group key assigned to a message group associated with the ascertained message identifier; and truncate the computed hash value.

17. The computing device of claim 16, wherein the counter value comprises a local message counter and a session number, the session number being incremented each time the first device boots up.

18. The computing device of claim 13, wherein the second device attempts to verify the data message using a group key assigned to a message group associated with a message identifier used by the second device, and wherein the data message comprises a controller area network (CAN) bus data frame.

* * * * *